July 22, 1969 P. DE LA BRETÈQUE 3,457,032
PROCESS FOR PURIFYING SOLUTIONS CONTAINING ALUMINATES
Filed May 11, 1965
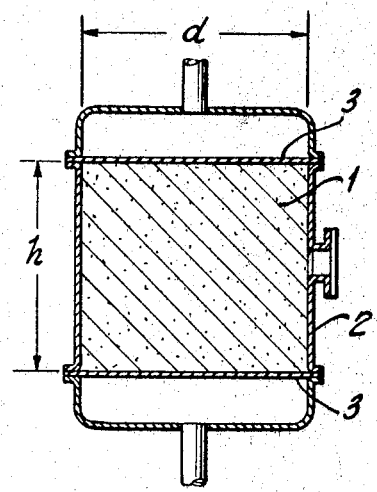
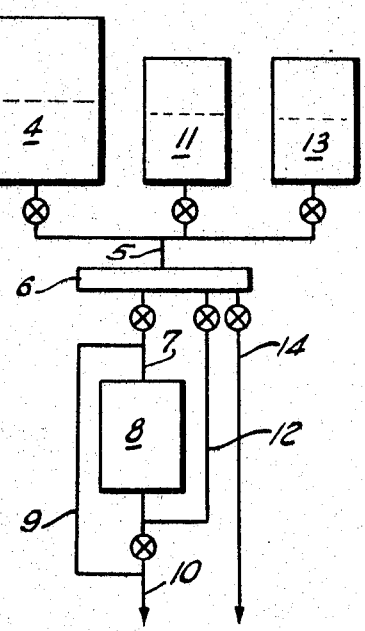
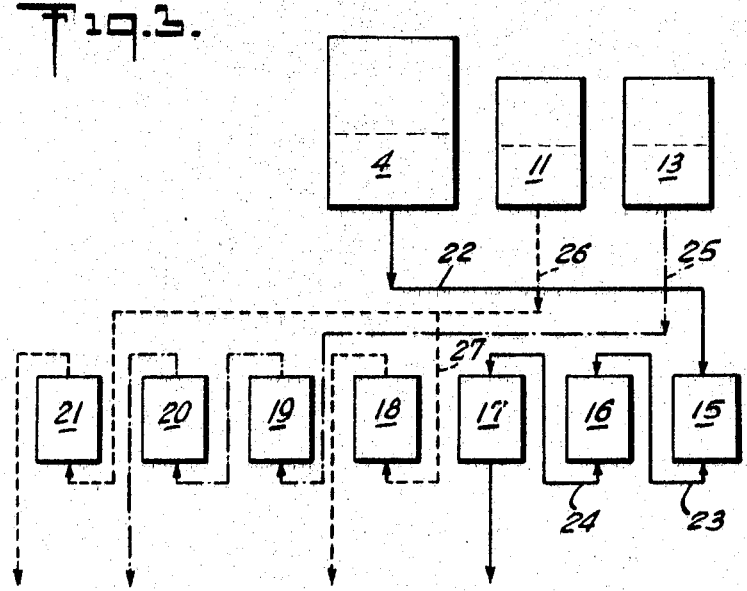
INVENTOR:
PIERRE DE LA BRETÈQUE
BY
Morrison Kennedy & Campbell
ATTORNEYS.

United States Patent Office 3,457,032
Patented July 22, 1969

3,457,032
PROCESS FOR PURIFYING SOLUTIONS
CONTAINING ALUMINATES
Pierre de la Bretèque, Marseille-St. Louis, France, assignor to Swiss Aluminium Ltd., Chippis (Switzerland), Chippis, Switzerland, a joint-stock company of Switzerland
Filed May 11, 1965, Ser. No. 454,931
Claims priority, application Switzerland, June 22, 1964, 8,140/64
Int. Cl. C01f 7/14, 7/36
U.S. Cl. 23—52           3 Claims

ABSTRACT OF THE DISCLOSURE

Process for the purification of strong alkaline solutions, particularly solutions of sodium aluminate obtained by alkaline digestions of bauxite and destined for the production of aluminium oxide consisting in treating the said solutions with anion exchange resins of strongly basic and macroreticular type which widely eliminate in particular, iron, silica, titanium, zinc and the organic acid impurities.

---

The present invention relates to a process for purifying solutions containing aluminates and a product produced thereby.

Aluminate solutions are of importance in industry, particularly alkali metal aluminates, which are a source of alumina. Alumina is widely used not only in the production of aluminium, but also as a catalyst, in the paper industry and for other chemical purposes. For such uses, it may be desirable to have available very pure alumina. For example, in some application of aluminium, a bright surface may be required, and this may be produced by chemical or electrolytic polishing followed by anodic oxidation. The degree of lustre attained by these surface treatments will depend on the purity of the metal used. If a high lustre is required for jewelry, ornamental objects or reflectors for example, it will be necessary to employ aluminium of high purity, such as 99.99%, produced by electrolytic refining or to employ special alloys containing refined aluminium. However, electrolytic refining appreciably increases the cost of the metal.

But many applications of brightened and anodized aluminium, for example in the automobile industry, for radiator grills, ornamental flushings, hub caps etc. do not require such high brightness as do jewelry pieces; it is quite sufficient and satisfactory to use for these purposes the best qualities of commercial aluminium, for example with a purity grade of 99.8–99.9%, as produced by the conventional electrolytic process, that is without refining. It is evident that the purity of aluminium produced by conventional electrolysis will be dependent upon the purity of the alumina used. Therefore, it is economically more advantageous to use a purified alumina for the electrolytic production of aluminium rather than to refine aluminium produced from impure alumina.

In the production of alumina from bauxite by the so-called "Bayer" process, bauxite is mixed with an alkaline solution, for instance sodium hydroxide, in an autoclave. The aluminium present in the ore is dissolved in the form of sodium aluminate. The greater proportion of the other ingredients, mainly silica and iron compounds, are not dissolved and remains in suspension. When the action in the autoclave is completed, the contents are diluted with water or with a dilute recycled solution, either during pressure release or immediately thereafter, and are then transferred to decanters in which the insoluble impurities are precipitated and separated. The liquor is subjected to a further filtration step to eliminate the last solid particles, and issues from the filter at a temperature of approximately 90° C. to 95° C.

Besides the sodium aluminate and excess sodium hydroxide, the filtered solution contains small quantities of impurities, either in the form of sodium salts (for example salts of silicon, titanium, phosphorus, vanadium, gallium, etc.), or in the form of complexes of the humus acids, originating from organic substances contained in the bauxite; the greater proportion of the dissolved iron not removed by filtering is probably in this form. These impurities give the liquor a more or less pronounced yellow or brown tint.

The filtered liquor is then cooled in heat exchangers to a temperature in the range of 50° to 70°, and then transferred to precipitating vessels in which precipitation of the sodium aluminate is carried out by agitation after priming the liquor with solid hydrate of alumina obtained from a prior operation. Most of the hydrate alumina in the liquor will precipitate and can subsequently be separated from the mother-liquors, and then calcined if necessary.

During the precipitation however, some of the impurities contained in the liquor precipitate with the hydrate of alumina or is absorbed by it. In practice, the impurities thus contained in the hydrate of alumina are not very troublesome if, after calcining, the alumina is intended for the conventional electrolytic production of aluminium unless aluminium of high purity is required.

It has already been proposed to purify the alumina obtained by the "Bayer" process by prolonged agitation of the mother-liquor in the presence of the residual sludges obtained from the autoclave, or by fractionated precipitation of hydrate of alumina, or by electrolysis of the mother-liquor, or by bringing the mother-liquor into contact with cellulose which absorbs a part of the soluble or pseudo-soluble impurities.

These methods have the disadvantage of being slow or complex or else of not permitting extensive elimination of the impurities.

One object of the present invention is to provide a new and improved process of purifying a solution containing soluble aluminates, without the drawbacks of the prior art described.

According to the present invention, a process for the purification of a solution containing soluble aluminates comprises passing the solution over an anion exchange resin. The process of the present invention is particularly useful in the purification of the solution containing alkali metal aluminates obtained in the so-called "Bayer" process. The anion exchange resins that are useful in the present invention are those resins which are basic and have a high degree of porosity.

In general, the ion exchange resins have a polymerized frame work or base, with a more or less extensively reticular structure which carries the active ionizable functional groups on which ion exchange with the solution occurs, the mobile ion being an anion in the case of anion exchangers. The production of the resin is performed in two main stages:

(a) Production of the base, by polymerization or condensation optionally in the presence of a catalyst, and (b) The introduction of the active functional groups by chemical processing of the polymer in one or more operations.

The production of the resin may, however, be performed in a single stage, if the molecules of the monomer already carry the ionizable active functional groups. Preferred resins for use in the invention are based on polystyrene or on styrene-divinylbenzene copolymers.

The resins particularly preferred are those described as "very porous," that is, those that have large pores allowing the passage therein of organic molecules of medium size. Moreover, the best results are obtained with resins of the type called "strongly basic," the preferred type being those with active quaternary amine groupings, in particular trimethylammonium-$N^+(CH_3)_3.X^-$ groupings, in which $X^-$ is the exchangeable anion.

The resins of the invention cause the discoloration of aluminate liquors, eliminating organic and metallic impurities. Structural differences, however, of the bases due mainly to the particular conditions of manufacture, affect behaviour of certain resins. Thus some resins cannot be regenerated conveniently, owing to the fact that they deteriorate and decompose more or less rapidly after a few operations.

It has been found that the strongly basic and porous resins used for processing sugar syrups are particularly suitable for use in the present invention.

The most preferred resins however, are those described as "macro-reticular." Resins based on polystyrene and styrene divinylbenzene copolymers, polymerized according to a different technique, have recently been perfected for the extraction of (polar) ions from non-aqueous (non-polar) solutions. The properties resulting therefrom for the resins are high chemical and mechanical resistance to the alternate action of aqueous and non-aqueous environments, that is to alternate desiccations and humidifications.

It has been discovered in accordance with the present invention that the resin of the present invention is resistant to the chemical shocks caused by alternately passing from alkaline solutions of aluminates to the neutral or slightly alkaline flushing or regenerating solutions. It has also been observed in accordance with the present invention that when aluminate solutions are passed over a column of resins, one of the main factors affecting the durability of the resins is the substantial volume variations (coarse grains in alkaline solutions, small in regenerating solutions). At a given instant, this results in considerable "packing" or contraction of the resins, while during the swelling of the grains, strains cause cracks or breaks in the grains; these disadvantages may be partly eliminated by alternating the passages of the liquids between a given direction and counterflow, or completely eliminated by employing "fluidized beds."

Any anionic resin may be used. However, in the purification of alkaline aluminate solutions obtained from the "Bayer" process, the macro-reticular resin "Amberlyst A-27" produced by Rohm & Haas Company, Philadelphia, has proven to be particularly satisfactory. This is a styrene-divinylbenzene copolymer converted to a quaternary ammonium anion exchanger by chloromethylation followed by amination with trimethylamine. Other suitable anionic resins are as follows: "Amberlyst A-26" and "A-29" and "Amberlite IRA 401S," all produced by Rohm & Haas, resins IMAC S5-30 and IMAC S5-40 produced by IMACTI Industrieele Maatschappij Activit N.V. Amsterdam and the resin Bayer MP 500 produced by Farbenfabriken Bayer Aktien-gesellschaft, Leverkusen-Bayerwerk. These other anionic resins have the same basic structure consisting of styrene-divinylbenzene copolymer with active groups of trimethylammonium.

Illustrative applications of the invention will now be described by way of example with reference to the accompanying drawings in which:

FIG. 1 is a sectional view of a fluidized bed;

FIG. 2 is a diagrammatic illustration of a simplified plant having a single resin exchange column; and FIG. 3 is a diagrammatic illustration of a simplified plant having seven resin exchange columns.

Referring to FIG. 1, resin 1 is placed in a cylinder 2, between two porous partitions 3, of for example, polyethylene. The diameter $d$ of the cylinder 2 should be equal to or greater than the distance $h$ between the partitions 3. The volume between the partitions 3 is permanently occupied by a suspension of resin 1 in the liquid which passes through the apparatus. The ratio of resin to liquid may vary, but it is preferred to use 1 volume of resin to 1 volume of liquid. It is essential to keep the resin in suspension. This may be done in various ways, for instance, by slight agitation or rocking of the column, or by means of an agitator (not shown) situated in the column. In the case where the liquid has a higher density than the resin, it will facilitate keeping the resin in suspension if the liquid flows from top to bottom of the apparatus, while if the converse is true, the liquid should be passed from bottom to top.

Referring now to FIG. 2, unpurified, already filtered, aluminate-containing solution, for instance obtained from the action of alkali on bauxite, is stored in vessel 4. It is passed via line 5 to a collector 6. The liquor is then passed via line 7 to a resin column 8, of the same construction, for example, as the column described with reference to FIG. 1. The liquor may be recycled through the resin column 8 via line 9. After the liquor has been contacted with the resin sufficiently, it may be removed from the apparatus via line 10. After removal of the liquor from the apparatus, water from vessel 11 passes to the collector 6 via line 5, and then passed via line 12 to the column 8 and recycled through column 8 via line 9 to rinse the resins. When the flushing is completed, the water is removed from the apparatus via line 10. The resin may then be regenerated by passing sodium chloride solution from vessel 13 to the column 8 via line 12 and recycling the regenerating solution via line 9 through the column 8 until the resin is regenerated. The sodium chloride solution may be removed from the apparatus via line 10. When the sodium chloride solution has been removed from the apparatus, the resin column is again flushed with water from vessel 11. The line 14 is used to directly discharge the vessels 4, 11, and 13. The cycle may then be repeated.

Referring now to FIG. 3, unpurified liquor from vessel 4 may be supplied to any of the resin exchange columns 15 to 21. In FIG. 3 the vessel 4 is supplying columns 15, 16 and 17 in series by way of lines 22, 23 and 24 and in this way the unpurified liquor is subjected during any one operating phase to three purification steps through three successive columns and need not necessarily be recycled. While the unpurified liquor is passing through columns 15, 16 and 17, columns 19 and 20 are being regenerated with sodium chloride from vessel 13 supplied via line 25. Meanwhile the remaining two columns 18 and 21 are being flushed with water from vessel 11 supplied via lines 26 and 27, column 18 having just previously been regenerated, and column 21 having just previously been purified. The cycle of operations is varied so that each column in turn will perform all three functions. This arrangement is most effective since it renders it possible to bring the liquor already extensively purified, say in columns 15 and 16, into contact with newly regenerated resin, say in column 17, so that the unpurified liquor need not be recycled through each column.

In the operation of the system shown in FIG. 3, the complete cycle of operation goes through seven successive phases listed as phases 1, 2, 3 . . . 7 in the following table, phase 1 being illustrated in FIG. 3. In the next phase 2, the liquor to be purified will go through columns 16, 17 and 18 connected in series, column 18 which has just been regenerated and finally washed being cut into the purifying line as the last column, while the most contaminated column 15 from phase 1 is cut out of the purifying line and cut in for washing, while column 19 which was previously being regenerated is being finally washed in preparation for cut-in to the purifying line in the next phase 3, and column 21 which was being washed after purifying in phase 1 is now connected in series with the column 20 and the two columns 20 and 21 are being regenerated, as shown in the following table. The other five operating phases 3 to 7 follow the same pattern as described and as shown in the following table, before returning to phase 1 again.

| Phase No. | Washing after purifying operation | Regeneration | Washing after regeneration | Purifying operation |
|---|---|---|---|---|
| (1) | 21 | ←20←19← | 18 | ←17←16←15← |
| (2) | 15 | ←21←20← | 19 | ←18←17←16← |
| (3) | 16 | ←15←21← | 20 | ←19←18←17← |
| (4) | 17 | ←16←15← | 21 | ←20←19←18← |
| (5) | 18 | ←17←16← | 15 | ←21←20←19← |
| (6) | 19 | ←18←17← | 16 | ←15←21←20← |
| (7) | 20 | ←19←18← | 17 | ←16←15←21← |
| Then return to (1) and so on | 21 | ←20←19← | 18 | ←17←16←15← |

It is seen from the foregoing table and description that in each operating phase, the dirty liquor enters first into the column in the purifying series which has been purifying during two previous operating phases, then enters the next column in the series which has been purifying during only one previously operating phase and finally enters the last column which has been freshly regenerated and finally washed. Therefore, for each phase, the relative conditions between the purifying columns and the liquor are similar to those of a typical counter-flow system. The same is also true for the generation.

In the operations described, the liquor enters the top of each purifying column and emerges from the bottom; the regenerating solution enters each column undergoing regeneration from the bottom of the column and emerges from the top; and similarly, the water enters each column undergoing washing from the bottom and emerges from the top.

The following examples illustrate the invention applied to sodium aluminate solution obtained from the Bayer process.

Example 1

For the two plants described in FIGS. 2 and 3, the corresponding relative period and volumes of the liquids flowing in the plant during each cycle may be used:

(1) Purification.—18 volumes of sodium aluminate liquor for purification is passed over 1 volume of fresh (regenerated) resin, at the rate of 6 volumes per hour, for 3 hours; the 18 volumes correspond to approximately half the stoichiometric capacity of the ion exchange resin (by avoiding saturation of the resins, this measure renders it possible to extend their period of activity).

(2) The first flushing.—5 volumes of water are made to pass over the resin in 1 hour after the operation described hereinabove.

(3) Regeneration.—10 volumes of NaCl solution at 100 g./l. is thereupon made to pass over the resin in 2 to 4 hours (say 5 to 2.5 volumes/hour).

(4) Second flushing: like the first, it consists of 5 volumes of water in 1 hour.

The solution and water employed are all at a temperature of between 20° and 40° C., and preferably at as low a temperature as possible within that range. The purified liquor may be conveyed to the precipitating vessels to obtain pure hydrate of alumina. The alkaline solutions are recovered and returned into the Bayer cycle. The salt solutions may finally be recovered for extraction of the salt by concentration or for extraction of certain of the components extracted from the liquors by the resins.

After a number of cycles, there is a risk of a deposit of hydrate of alumina being retained between the grains of the resin. It has been found that if the following procedure is followed this clogging of the resin will not occur.

(1) The pores of the partitions 3 of the column of FIG. 1 should be as large as possible, that is to say just small enough to prevent the passage of the grains of resin; preferably the pore diameter is between 0.1 and 0.2 mm. The grains of hydrate of alumina which will be smaller than the grains of resin will thus pass from the columns.

(2) From time to time (every 20 cycles for example), a flushing operation may be performed on the resins before their regeneration with a dilute solution of caustic soda: for example, 5 volumes of NaOH solution at 50 g./l. per volume of resin in 1 hour.

(3) If a substantial formation of hydrate of alumina has occurred in a long run, it may be separated by draining the resins into a vat containing a saturated solution of calcium chloride. After a few minutes agitation, the resins are separated from the hydrate of alumina by virtue of different density, the resins floating to the surface of this solution.

The regeneration of the resins as described hereinabove renders it possible to maintain their initial capacity for a relatively great number of cycles. In order, however, to reduce the partial loss of capacity in a long run, complementary regeneration (following the normal regeneration) should be performed periodically (every 10 or 20 cycles for example), by passing 10 volumes of a solution containing 100 g./l. of sodium nitrate and 10 g./l. of caustic soda over 1 volume of resin in 4 hours, flushing with water being performed thereafter in the usual way.

Example 2

A plant using the fluidized beds described in FIG. 1 has been employed for the purification of a filtered but nondecomposed aluminate liquor from the Bayer process. For passage over the exchanger it had been cooled to approximately 30° C.

Before purification, this liquor had the following composition:

| | G./l. |
|---|---|
| $Na_2O$ | 160 |
| $Al_2O_3$ | 135 |

| Impurities titrated: | Mg./l. |
|---|---|
| $SiO_2$ | 500 |
| $Fe_2O_3$ | 40 |
| $TiO_2$ | 10 | plus a certain quantity of impurities which were not analyzed. After purification over the anion exchanger, the titrated impurities had been reduced to the following values:

| | Mg./l. |
|---|---|
| $SiO_2$ (70% of the initial value) | 350 |
| $Fe_2O$ (5% of the initial value) | 2 |
| $TiO_2$ (2% of the initial value) | 0.2 |

It was observed that the method allows extensive elimination of certain metallic impurities, as apparent from the titrations of iron and titanium reported hereinabove.

In addition to iron and titanium, other elements, in particular zinc, not specified in the analytical results given, can be similarly fixed by the column of anion exchange resin.

While the invention has been described with particular reference to a specific embodiment, it is to be understood that it is not to be limited thereto but is to be construed broadly and resricted solely by the scope of the appended claims.

What is claimed is:

1. A process for purification of a strongly alkaline solution of soluble alkali metal aluminate, comprising passing the solution into, through, and out of a bed of a strongly basic anion exchange resin in volume sufficient to form a suspension of the resin in the solution, and maintaining the resin in suspension during the passage of the solution therethrough whereby substantial amounts of anions capable of being retained by the exchange resin in said bed are removed from the solution including anions containing iron, silicon, titanium or zinc present in the solution in the form of alkali metal salts.

2. A process as claimed in claim 1 in which the anion exchange resin is macroreticular.

3. A process as claimed in claim 1 in which the anion exchange resin is a member of the group consisting of polystyrenes, styrene-divinyl-benzene copolymers and substances with, as active functional groupings, trimethyl-ammonium-$N(CH_3)_3 \cdot X^-$, wherein $X^-$ is the exchangeable anion.

References Cited

UNITED STATES PATENTS 2,771,418  11/1956  Feegers.
2,967,833  1/1961  Kimberlin.
2,977,185  3/1961  Goodenough _____ 23—52 X
3,073,675  1/1963  Leum et al. _____ 23—141
3,098,044  7/1963  Gloves _____ 23—143 X HERBERT T. CARTER, Primary Examiner U.S. Cl. X.R.

23—143